US010852351B1

(12) United States Patent
Li et al.

(10) Patent No.: US 10,852,351 B1
(45) Date of Patent: Dec. 1, 2020

(54) ITERATIVE APPROACH TO DETERMINE FAILURE THRESHOLD ASSOCIATED WITH DESIRED CIRCUIT YIELD IN INTEGRATED CIRCUITS (71) Applicant: International Business Machines Corporation, Armonk, NY (US)

(72) Inventors: Tong Li, Austin, TX (US); David Winston, Asheville, NC (US); Pravin Kamdar, Leander, TX (US); Richard Daniel Kimmel, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/426,651

(22) Filed: May 30, 2019

(51) Int. Cl.
G01R 31/317 (2006.01)
G06F 30/30 (2020.01)
G06F 119/18 (2020.01)

(52) U.S. Cl.
CPC . *G01R 31/31704* (2013.01); *G01R 31/31725* (2013.01); *G06F 30/30* (2020.01); *G06F 2119/18* (2020.01)

(58) Field of Classification Search
USPC .......................................................... 716/56
See application file for complete search history.

(56) References Cited

U.S. PATENT DOCUMENTS 7,493,574 B2  2/2009  Liu et al.
7,512,508 B2  3/2009  Rajski et al.
8,176,445 B1  5/2012  Qian
8,806,418 B1  8/2014  Jallepalli et al.
9,483,602 B2  11/2016 McConaghy et al.
9,805,158 B1  10/2017 Liu et al.
(Continued)

FOREIGN PATENT DOCUMENTS

EP  2154621 A1  2/2010

OTHER PUBLICATIONS

Jallepalli et al., "Employing Scaled Sigma Sampling for Efficient Estimation of Rare Event Probabilities in the Absence of Input Domain Mapping", IEEE Transactions on Computer-Aided Design of Integrated Circuits and Systems, vol. 35, No. 6, Jun. 2016, pp. 943-956.
(Continued)

*Primary Examiner* — Mohammed Alam
(74) *Attorney, Agent, or Firm* — Cantor Colburn LLP; Erik Johnson (57) ABSTRACT Systems and methods of developing an integrated circuit implement selecting a desired yield for a circuit used in the integrated circuit. The desired yield corresponds to a desired failure probability of the circuit. The method includes determining a parameter threshold value that corresponds with the desired yield. The circuit passes if a parameter associated with the circuit is below the parameter threshold value and the desired yield indicates a percentage of instances of the circuit that pass according to the parameter threshold value. The method also includes using the parameter threshold value that corresponds with the desired yield during testing and improvement of a design of the integrated circuit, and providing the design of the integrated circuit for fabrication.

20 Claims, 8 Drawing Sheets (56) References Cited

U.S. PATENT DOCUMENTS

2006/0066339 A1* 3/2006 Rajski .................... G01R 31/01
                                                    324/762.02
2016/0147934 A1* 5/2016 Keller ................... G06F 30/367
                                                    716/115

OTHER PUBLICATIONS

Maten et al., "Optimization of Electronic Circuits", WSCP, 2006, pp. 1-13.
Sun et al., "Fast Statistical Analysis of Rare Circuit Failure Events via Scaled-Sigma Sampling for High-Dimensional Variation Space", IEEE Transactions on Computer-Aided Design of Integrated Circuits and Systems, vol. 34, No. 7, Jul. 2015, pp. 1096-1109.

* cited by examiner

ITERATIVE APPROACH TO DETERMINE FAILURE THRESHOLD ASSOCIATED WITH DESIRED CIRCUIT YIELD IN INTEGRATED CIRCUITS

BACKGROUND

The present invention relates to integrated circuit development, and more specifically, to an iterative approach to determining a failure threshold associated with a desired circuit yield in an integrated circuit.

The development of an integrated circuit (i.e., chip) can include a number of phases from the logic design to the manufacture. The processes associated with the various phases of chip development include obtaining a register transfer level (RTL) description and performing physical design to identify and place components such as gate logic. The physical design processes generally begin with logic synthesis, which maps the RTL description to a gate-level netlist (i.e., list of interconnects), and end with tapeout and mask generation, which refers to turning the design data into photomasks that are used in the manufacturing process. The physical design processes also include routing, which refers to adding the wires that connect gates and other components in the netlist. Performance analysis can be undertaken iteratively and at different phases to ensure that the final chip meets all timing and performance requirements. An aspect of performance analysis is the consideration of manufacturing variation in the predicted yield.

SUMMARY

Embodiments of the present invention are directed to systems, methods, and computer program products to develop and integrated circuit. A method includes selecting a desired yield for a circuit used in the integrated circuit. The desired yield corresponds to a desired failure probability of the circuit. A parameter threshold value that corresponds with the desired yield is determined. The circuit passes if a parameter associated with the circuit is below the parameter threshold value and the desired yield indicates a percentage of instances of the circuit that pass according to the parameter threshold value. The method also includes using the parameter threshold value that corresponds with the desired yield during testing and improvement of a design of the integrated circuit, and providing the design of the integrated circuit for fabrication.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, the performance analysis that drives design changes during integrated circuit development includes consideration of predicted yield. The consideration of yield arises because of the variation in features (e.g., transistor gate length, electron mobility, gate work function) that prevent every copy of a given circuit from behaving identically. The range of variation of different features can be provided by a fabricator, for example. A given integrated circuit, which is made up of many circuits, can reuse the same circuit in a million places, for example. Yield refers to the proportion of those circuits that will have one or more parameters of interest inside an acceptable range. Thus, a high yield is desirable.

The circuit simulations that are implemented as part of the performance analysis can output delay (i.e., the time for a given signal to travel between an output pin of one component, through an interconnect (i.e., wire), to an input pin of another component) as an exemplary parameter of interest. A number of circuit simulations can be performed to consider different feature values within the specified variation range and to obtain a non-Gaussian probability density function (pdf) of delay values, for example. A threshold can be selected for this non-Gaussian pdf such that delay values that exceed that threshold value represent a failure. That is, values of the non-Gaussian curve that are above the threshold value indicate the failure rate. Thus, the threshold can be referred to as a pass/fail threshold. The non-Gaussian pdf associated with the pass/fail threshold can be used to obtain a Gaussian pdf whose standard deviation (i.e., sigma ($\sigma=1$) value) corresponds with yield. The failure probability indicated by the non-Gaussian pdf can be translated to Z-value, the yield value, of standard Gaussian distribution. Specifically, (1−failure rate) translates to the yield (the part of the Gaussian curve within $\sigma=1$). The determination of yield corresponding with a given threshold can be considered as a forward approach. Thus, the determination of threshold corresponding with a desired yield can be considered as a reverse approach.

Embodiments of the invention relate to an iterative approach to determine a failure threshold associated with a desired circuit yield in an integrated circuit. While the iterative process implements iterations of the forward approach, the goal of identifying the threshold that corresponds with a desired yield (i.e., the basis for the iterative process) is the reverse approach. Once the threshold has been determined, the iterative process of developing the final design can consider the threshold during timing analysis and other performance assessments. That is, a particular yield is of interest, and the approach according to one or more embodiments of the invention facilitates determining the threshold that corresponds to the desired yield. The threshold is a more practical and direct metric to use in developing the final design than the yield to which it corresponds. The number of simulations (i.e., samples with different feature values) needed to determine a threshold corresponding to a low yield is much fewer than the number of simulations needed to determine a threshold corresponding to a high yield. The iterative approach detailed herein facilitates converging on the threshold value that corresponds to the desired yield.

Figure 1:
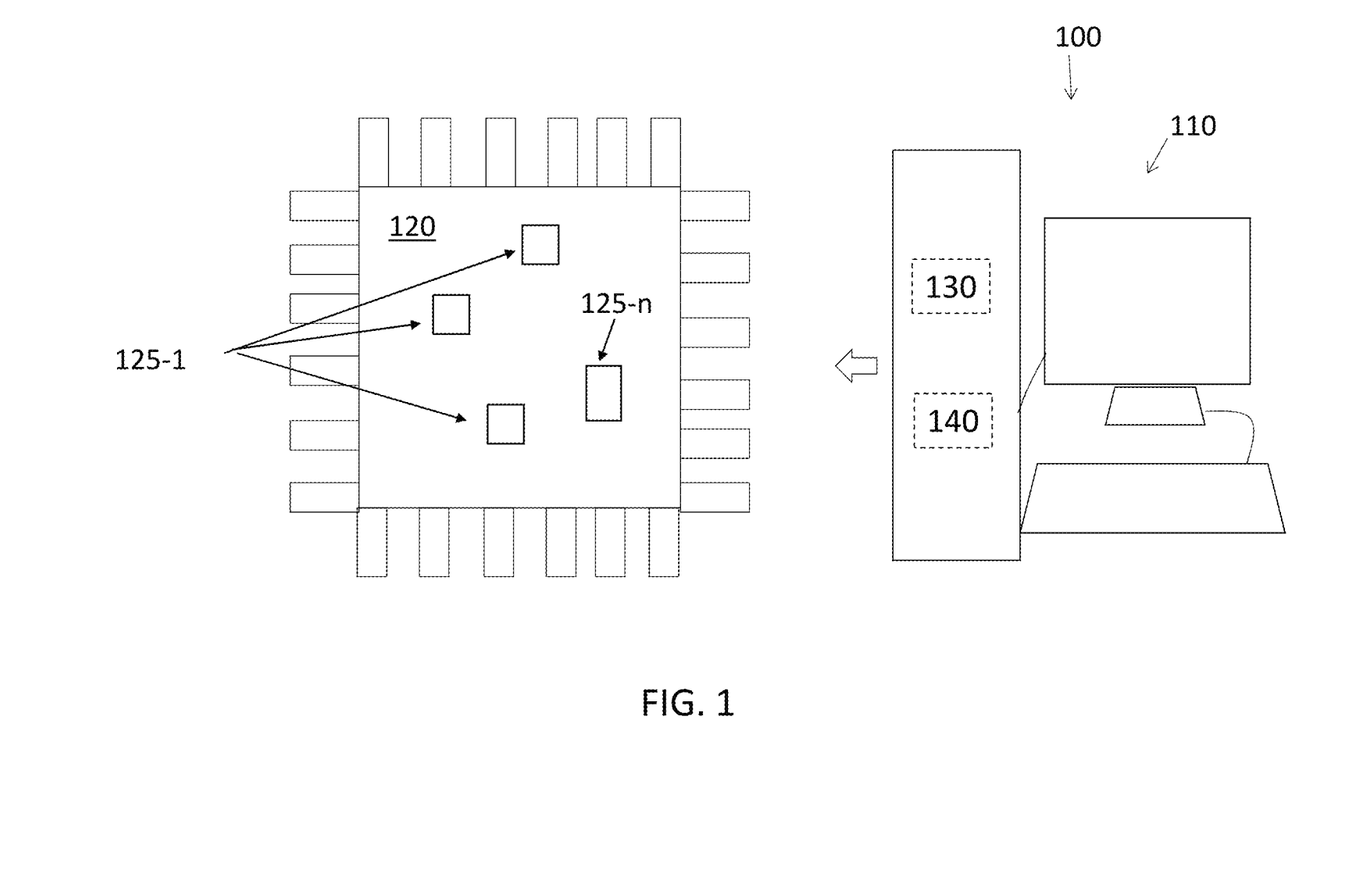
FIG. 1 is a block diagram of a system to determine a failure threshold associated with a desired circuit yield in an integrated circuit according to one or more embodiments of the invention.

FIG. 1 is a block diagram of a system 100 to determine a failure threshold associated with a desired circuit yield in an integrated circuit according to one or more embodiments of the invention. The system 100 includes processing circuitry 110 used to generate the design that is ultimately fabricated into an integrated circuit 120. The integrated circuit 120 is shown to include circuits 125-1 and 125-n (generally referred to as 125). Three instances of the circuit 125-1 are shown. As previously noted, a given circuit 125 can be used many times in different parts of the integrated circuit 120. If one of the three exemplary circuits 125-1 failed, then the yield would be 66 percent. If the desired yield were 90 percent, then, by knowing the corresponding threshold, for delay or another circuit simulation output, the threshold could be used during development and testing to ensure that yield. The steps involved in the fabrication of the integrated circuit 120 are well-known and briefly described herein.

Once the physical layout is finalized, based, in part, on using the automatic layer trait generation and promotion cost computation according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 8. The processing circuitry 110 includes one or more memory devices 130 and one or more processors 140. Multiple of the processors 140 may be used in the integrated circuit design and, specifically, the determination of a failure threshold associated with a desired circuit yield that is detailed herein. The memory device 130 stores a design of the integrated circuit 120 during the design phases of the development and also stores instructions implemented by the processor 140. As further discussed, these instructions include processes used to determine a failure threshold associated with a desired circuit yield, as further discussed below.

Figure 2:
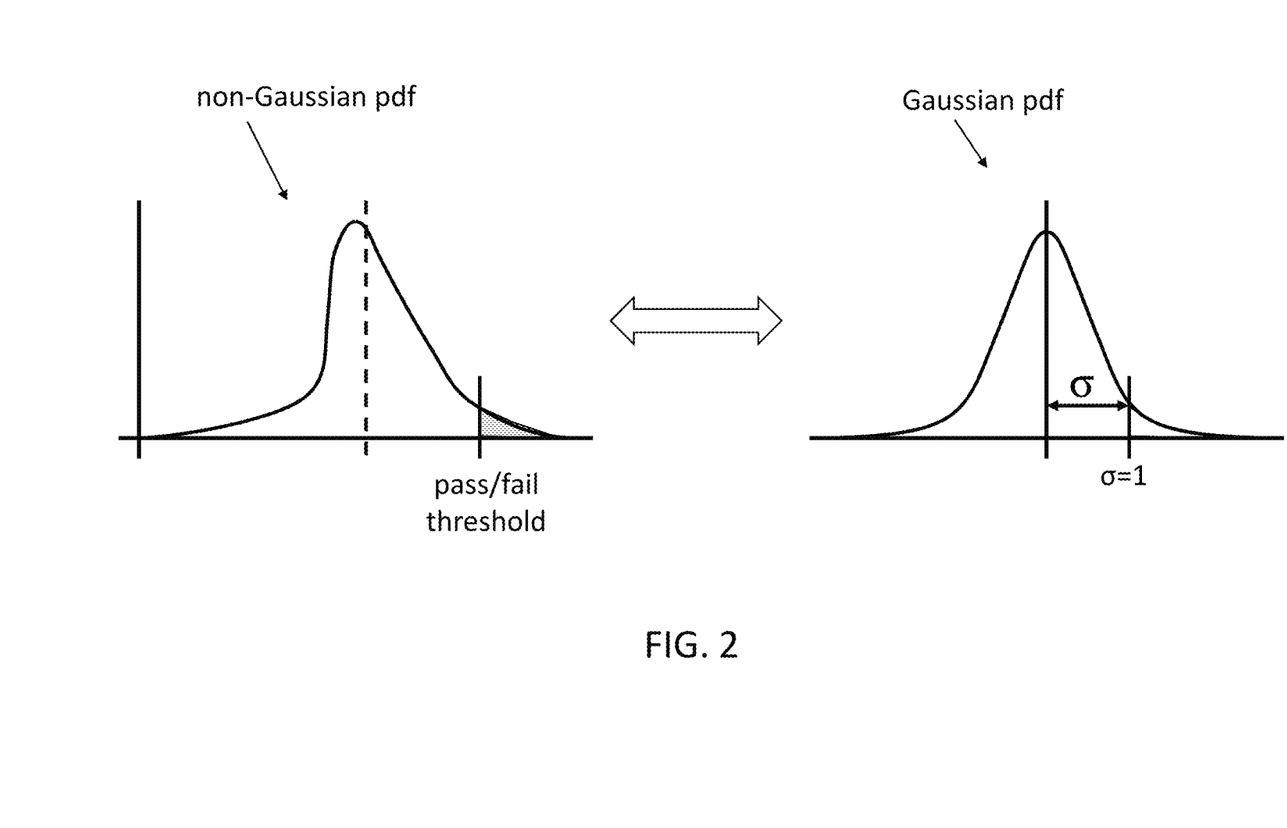
FIG. 2 shows the relationship that is used to facilitate the iterative approach to determining a failure threshold associated with a desired circuit yield according to one or more embodiments of the invention.

FIG. 2 shows the relationship that is used to facilitate the iterative approach to determining a failure threshold associated with a desired circuit yield according to one or more embodiments of the invention. A non-Gaussian pdf is shown with the pass/fail threshold indicated. The non-Gaussian pdf may be generated from delay values, for example, that are determined for a given set of feature values. In the exemplary case, delay values above the pass/fail threshold value represent failure probability for the circuit that was analyzed with the set of feature values. A corresponding Gaussian pdf is shown with the $\sigma=1$ value indicated. The yield is indicated by the portion of the Gaussian curve that is within the $\sigma=1$ region. According to one or more embodiments of the invention, the desired yield is used as the starting point, and the pass/fail threshold corresponding with that desired yield is determined as detailed herein. Once the pass/fail threshold corresponding with the desired yield is determined, it can be used in the process of finalizing the design of the integrated circuit 120. For example, if the pass/fail threshold for delay that corresponds with a desired yield is determined, that threshold delay value can be used in performing timing analysis during the design of the circuit.

Figure 3:
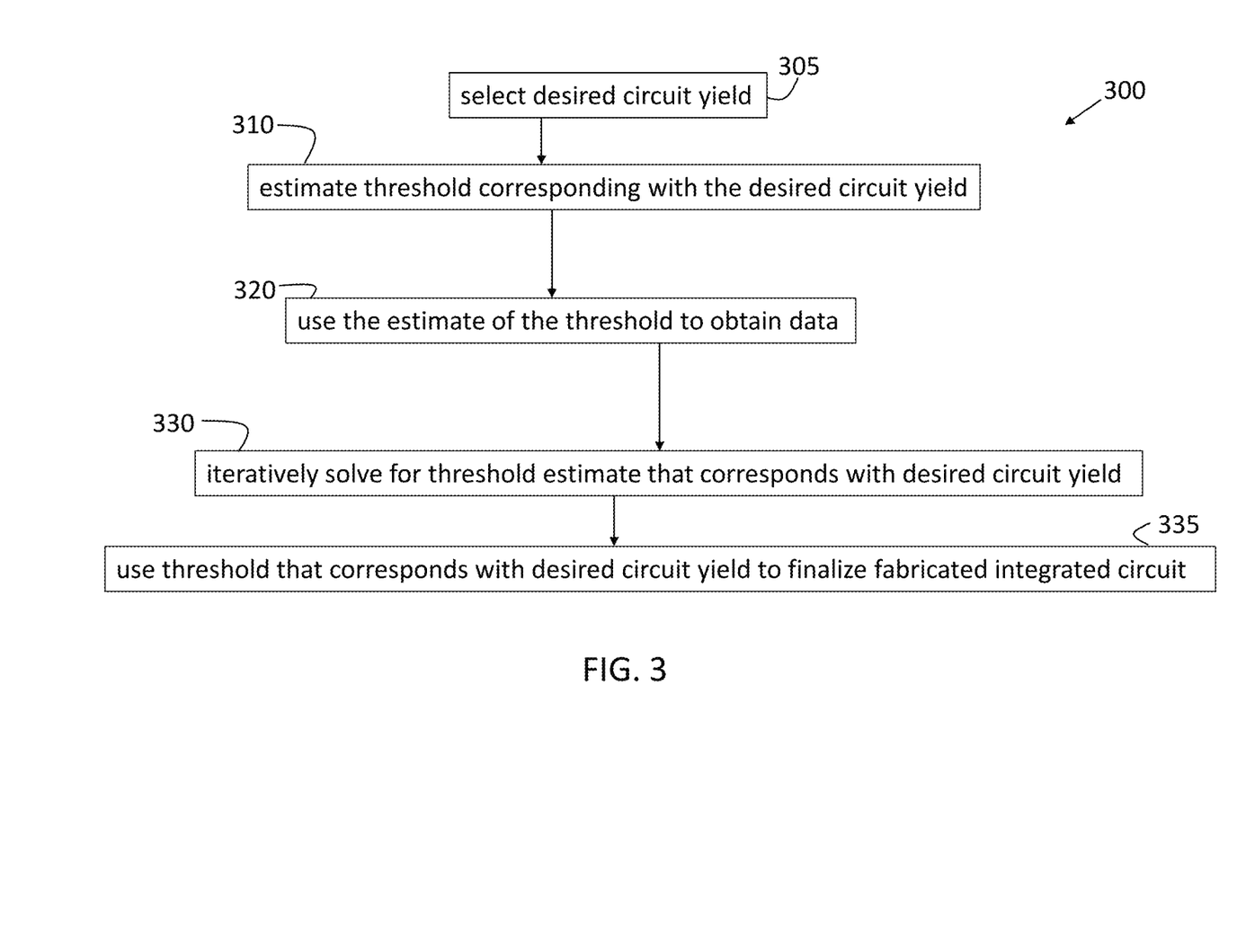
FIG. 3 is a process flow of a method of determining a failure threshold associated with a desired circuit yield for a circuit in an integrated circuit according to one or more embodiments of the invention.

FIG. 3 is a process flow of a method 300 of determining a failure threshold associated with a desired circuit yield for a circuit 125 in an integrated circuit 120 according to one or more embodiments of the invention. The processes shown in FIG. 3 are performed after at desired circuit yield is selected, at block 305, for a given circuit 125. At block 310, estimating a threshold corresponding with the desired yield can be a rough estimate used as a starting point in a subsequent iterative process at block 330. At block 320, using the estimate of the threshold, at block 310, to obtain data refers to performing the forward approach. This process is further detailed with reference to FIG. 5. Essentially, at block 320 samples 510 (FIG. 5) are obtained for reuse in the iterative process at block 330. At block 330, iteratively solving for the threshold estimate that corresponds with the desired circuit yield for the circuit 125 is further detailed with reference to FIG. 4. As noted, the iterative process at block 330 uses the samples 510 that were obtained at block 320. Once the threshold that corresponds with the desired circuit yield is determined through the process at block 330, the threshold (e.g., delay threshold) can be used, at block 335, during the testing (e.g., timing analysis) and potential modification of the circuit 125 to ensure that the final design that is fabricated will correspond with the desired yield.

Figure 4:
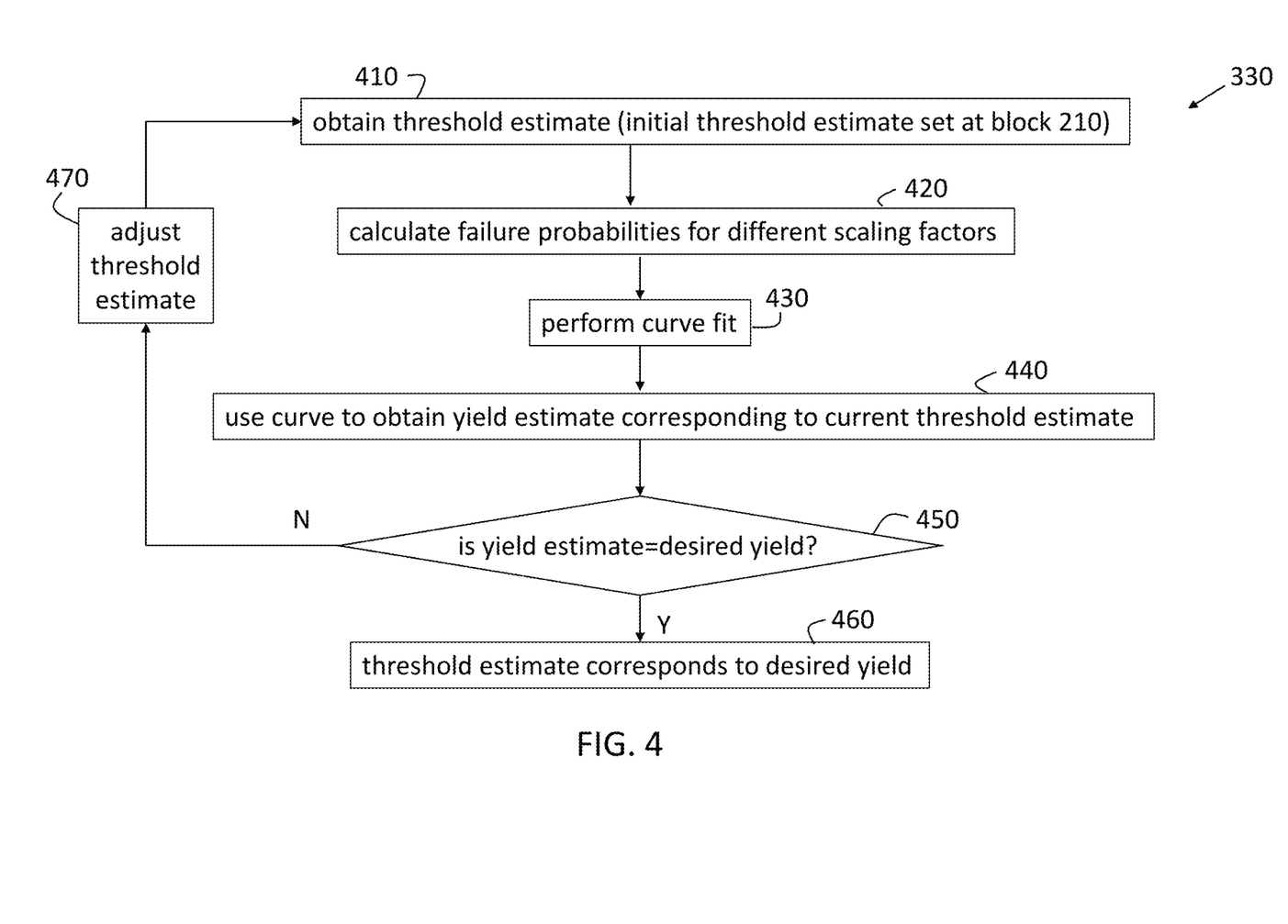
FIG. 4 is a process flow detailing the iterative process indicated in FIG. 3.

FIG. 4 is a process flow detailing the iterative process at block 330 of FIG. 3. At block 410, obtaining a threshold estimate refers to using the threshold set at block 310 as the initial threshold estimate in the first iteration. Calculating failure probabilities for different scaling factors, at block 420, and performing a curve fit, at block 430, are further detailed with reference to FIG. 5. Failure probability relates to yield. That is, yield can be thought of as success probability. If the failure probability for a circuit 125 is 25 percent, then the yield (i.e., success probability) is 75 percent. Once the curve fit is performed, at block 430, the processes include using the curve to obtain the yield estimate corresponding with the current threshold estimate, at block 440. A check is done, at block 450, of whether the yield estimate obtained at block 440 is the same as the desired yield. If so, then, at block 460, the threshold estimate obtained at block 410 is determined to correspond to the desired yield. If, based on the check at block 450, the yield estimate obtained at block 440 is not the same as the desired yield, then the processes include adjusting the threshold estimate, at block 470. This results in a different threshold estimate being obtained, at block 410, for the next iteration of the processes. The determination of how to adjust the threshold estimate for each iteration can be based on a specific strategy for converging on the threshold that corresponds with the desired yield. An exemplary strategy is discussed with reference to FIG. 6.

Figure 5:
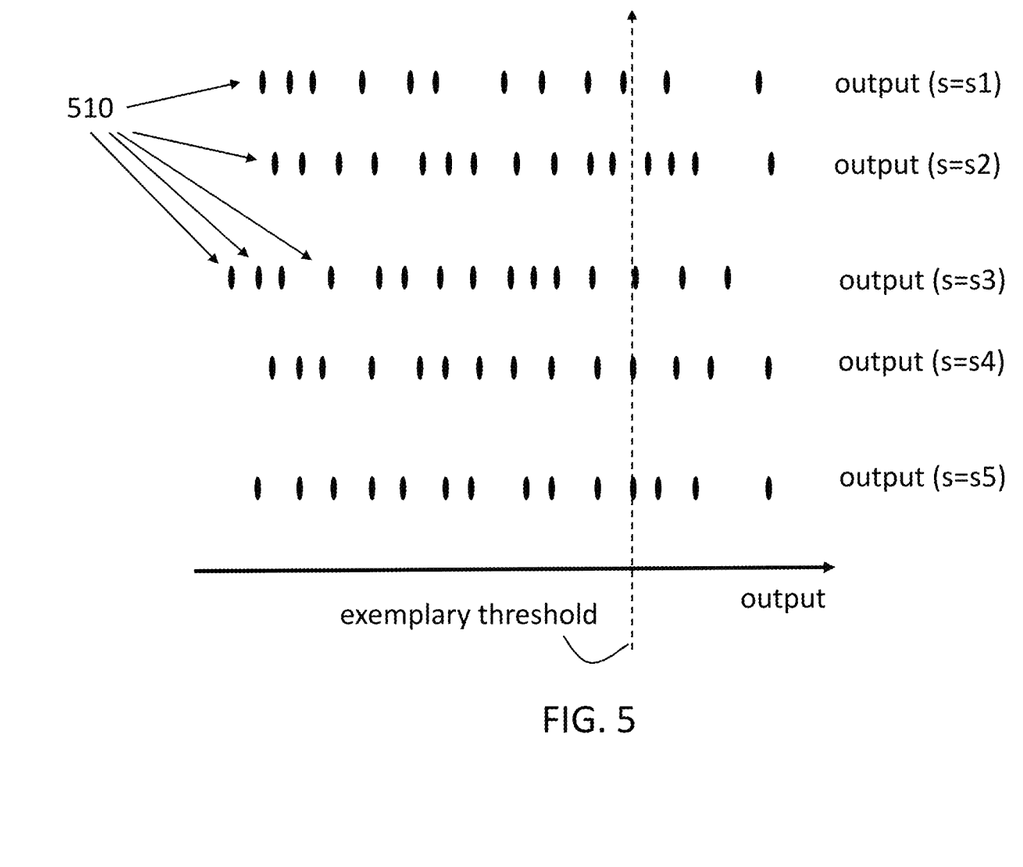
FIG. 5 shows circuit simulation outputs that are used in the iterative process detailed in FIG. 4.
Figure 6:
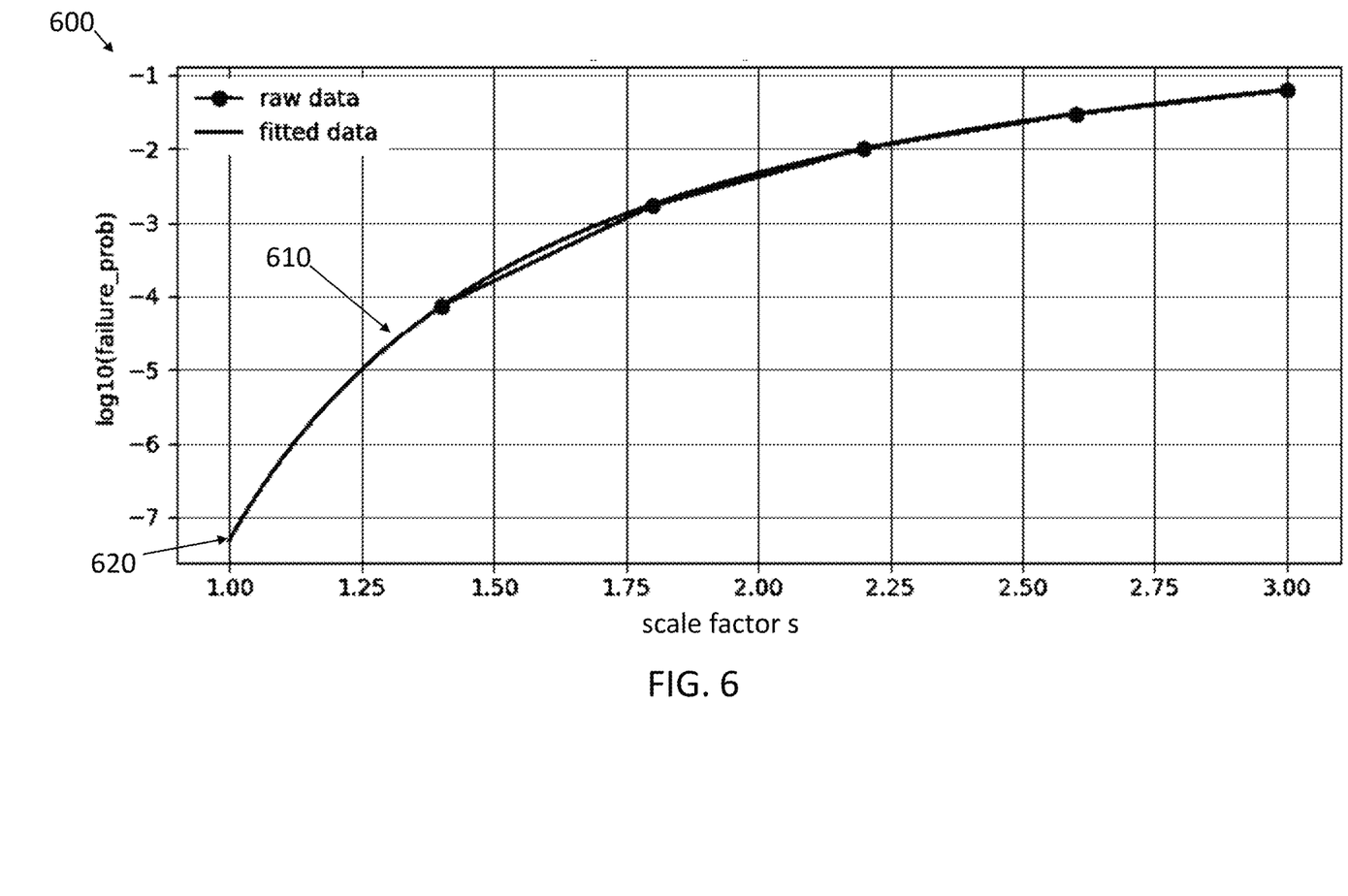
FIG. 6 shows an exemplary graph that is generated using different scale factors and that facilitates determination of yield as part of the iterative process detailed in FIG. 4.

FIGS. 5 and 6 illustrates the processes of calculating failure probabilities for different scaling factors, at block 420, and performing a curve fit, at block 430 (FIG. 4). Calculating failure probabilities (or success probabilities (i.e., yields)), at block 420, is based on data generated at block 320 (FIG. 3), as discussed. As previously noted, circuit simulations are performed by varying values of the different features within their specified variation ranges. A non-Gaussian pdf is associated with the pass/fail threshold while a corresponding Gaussian pdf whose sigma ($\sigma=1$) value indicates yield. In order to obtain the $\sigma=1$ value for a large value of the desired yield, a large number of circuit simulations must be performed.

In fact, the larger the desired circuit yield value, the larger the number of circuit simulations that are needed to validate the yield value. Thus, scaling up the variation in the features is a way to reduce the number of required circuit simulations because it lowers the (artificial target) circuit yield. For example, by using a scale factor s of 3, the σ=3 value of the Gaussian pdf is obtained rather than the σ=1 value. As another example, by using a scale factor s of 6, the σ=6 value of the Gaussian pdf is obtained. For comparison, while 1000 sets of variations in the features and corresponding circuit simulation results (i.e., samples 510 (FIG. 5)) may be needed to determine a pass/fail threshold that translates to a yield of roughly 3 σ (σ=3), scaling the input feature variations by 2 facilitates using only 100 sets of variations in the features and corresponding circuit simulation results (i.e., samples 510) because the desired pass/fail threshold need only correspond with a lower yield value of 1.7σ. Calculating failure probabilities for different scaling factors, at block 420, uses the samples 510. As shown in FIG. 6, a curve fit process can be used to estimate yield (σ=1) based on the failure probabilities for the different scaling factors.

FIG. 5 shows circuit simulation outputs or samples 510 that are used for calculating failure probabilities for different scaling factors s, at block 420 (FIG. 4). The samples 510 resulting from five different exemplary scale factors s1 through s5 are shown. As previously noted, each scale factor is a multiple by which input feature variations are scaled such that the subsequent circuit simulation output (i.e., sample) is impacted. The output can be, for example, delay value or any other circuit simulation output. An exemplary threshold is shown. For a given iteration of the processes that are part of block 330 and shown in FIG. 4, this threshold is the threshold estimate obtained at block 410. Samples 510 to the right of the exemplary threshold represent failures. For example, delay values greater than the threshold represent failures (i.e., do not pass the timing requirements for signals within the circuit 125). For the scale factor s1, for example, two of the twelve samples 510 exceed the exemplary threshold. Thus, the failure probability for the scale factor s1 is 2/12. This also means that the success probability (i.e., yield) is 10/12 or 83 percent. As previously noted, the samples 510 used to calculate failure probabilities at block 420 are obtained at block 320 and reused in each iteration of block 330.

FIG. 6 shows an exemplary graph 600 that is generated using different scale factors and that facilitates determination of yield. As indicated, the scale factor s is shown along one axis. A logarithmic scale is used to indicate failure probability $\log_{10}$(failure_prob) associated with each scale factor s. As FIG. 6 shows, five $\log_{10}$(failure_prob) values are indicated for the five scale factors s1 through s5. By fitting a curve 610 to the values, the curve 610 can be used to determine the $\log_{10}$(failureprob) value corresponding with a scale factor s of 1 (the value at 620). The yield corresponding with this $\log_{10}$(failureprob) value is the yield estimate obtained at block 440 (FIG. 4).

Figure 7:
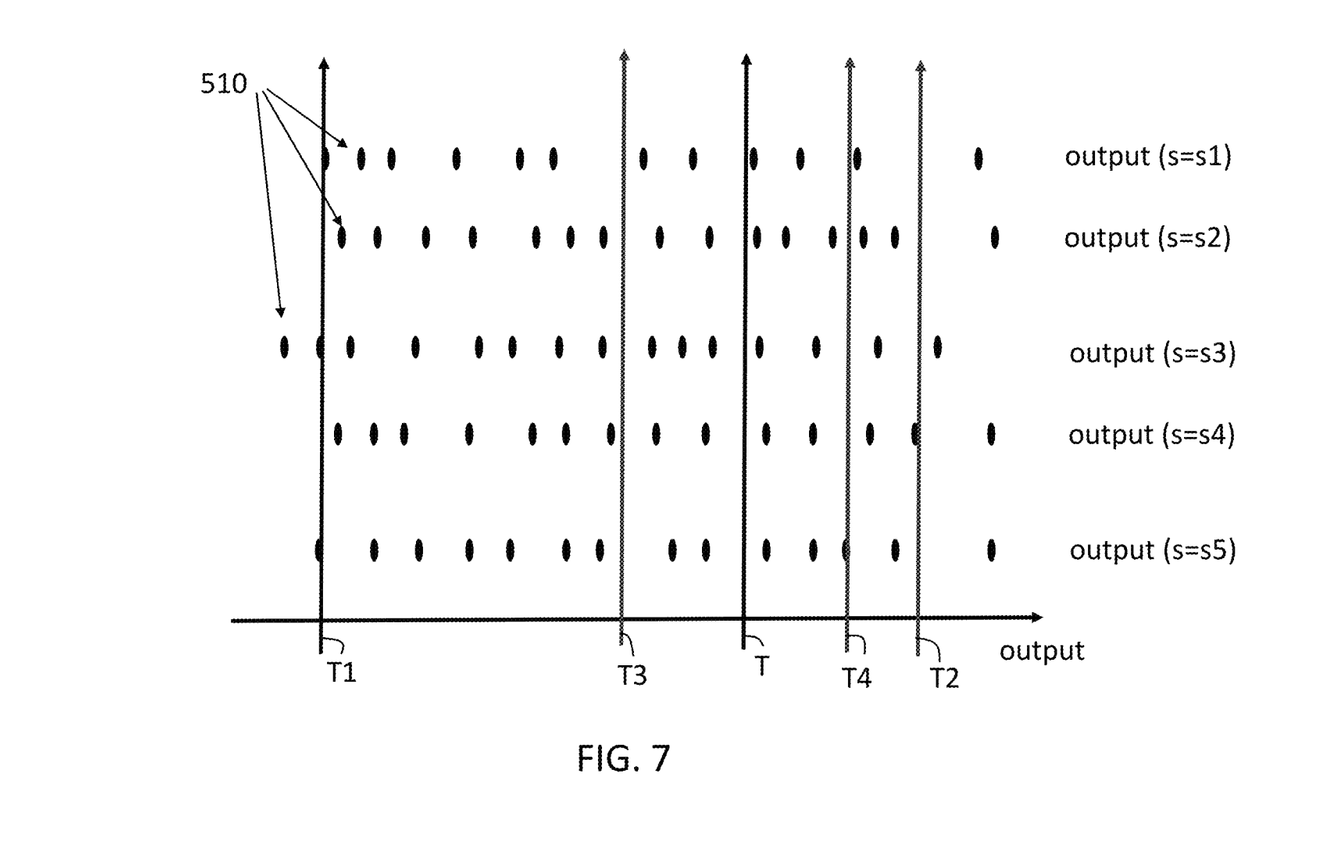
FIG. 7 illustrates an exemplary strategy for performing an adjustment as part of the iterative process detailed in FIG. 4.

FIG. 7 illustrates a strategy for adjusting the threshold estimate at block 470 (FIG. 4) to converge on the threshold estimate that corresponds with the desired yield by using the iterative process at block 330 (FIG. 3) that is detailed in FIG. 4. The approach discussed with reference to FIG. 7 is referred to as a binary search and is only one exemplary approach that is detailed for explanatory purposes. The adjustment of the threshold estimate, at block 470, can be performed using different approaches to converge on the threshold that corresponds with the desired yield, at block 460.

FIG. 7 shows samples 510 obtained as simulation results for different scale factors s. The five exemplary scale factors s1 through s5 shown in FIG. 5 are used again. The threshold that corresponds with the desired yield is indicated as threshold T. This is the threshold that the iterative process at block 330 is used to identify. In the exemplary binary approach, a lower bound threshold estimate T1 is found first. This lower bound threshold estimate T1 can be determined based on the lowest values of the samples 510, for example. That is, in the exemplary case in which the samples 510 indicate delay, the minimum delay values for most of the scale factors s can be used to set the lower bound threshold estimate T1. At block 440, the yield corresponding with this lower bound threshold estimate T1 will be found to be lower than the desired yield. That is, the failure probability will be much higher when the lower bound threshold estimate T1 is used instead of the threshold T that corresponds with the desired yield. This is clear from the larger number of samples 510 (i.e., failing samples 510) to the right of the lower bound threshold estimate T1 in FIG. 7 as compared to the samples 510 to the right of the threshold T that corresponds with the desired yield.

When it is determined, at block 450, that the lower bound threshold estimate T1 does not result in a yield estimate that is equal to the desired yield, the threshold estimate is adjusted for the next iteration at block 470. This adjustment sets the threshold estimate at an upper bound threshold estimate T2. The highest values of the samples 510 for the different scaling factors s can be used to determine the upper bound threshold estimate T2. As FIG. 7 indicates, a smaller number of samples 510 is to the right of the upper bound threshold estimate T2 (i.e., fewer failing samples 510) than to the right of the threshold T that corresponds with the desired yield. Thus, the yield associated with the upper bound threshold estimate T2 is higher and the failure probability is lower than what is associated with the threshold T that corresponds with the desired yield.

When it is determined, at block 450, that the upper bound threshold estimate T2 does not result in a yield estimate that is equal to the desired yield, the threshold estimate is adjusted for the next iteration at block 470. This adjustment sets the threshold estimate at an average threshold estimate T3 of the lower bound threshold estimate T1 and the upper bound threshold estimate T2. At block 440, the yield associated with the average threshold estimate T3 will be found to be lower than the desired yield. This is because the average threshold estimate T3 is to the left of the threshold T that corresponds with the desired yield and, thus, is associated with a higher failure probability. Thus, the yield determined at block 440 will indicate that the average threshold estimate T3 is below the threshold T that corresponds with the desired yield.

Once it is determined that the average threshold estimate T3 is less than (rather than greater than) the threshold T that corresponds with the desired yield, the adjustment, at block 470, for the next iteration will result in a second upper bound threshold estimate T4. The second upper bound threshold estimate T4 can be found as a value between the average threshold estimate T3 and the upper bound threshold estimate T2. In an alternate scenario, the average threshold estimate T3 could be found to be greater than (rather than less than) the threshold T that corresponds with the desired yield. This determination would be based on the yield estimate at block 440 being higher than the desired yield when the threshold estimate set at block 410 is the average threshold estimate T3. In that case, a second lower bound threshold estimate between the average threshold estimate T3 and the lower bound threshold estimate T1 would set as the threshold estimate at block 410 for the next iteration. An average of the average threshold estimate T3 and the second upper bound threshold estimate T4 would be used in the next iteration and the iterations would continue as described until the threshold estimate set at block 410 results in a yield at block 440 that is the same as the desired yield.

Figure 8:
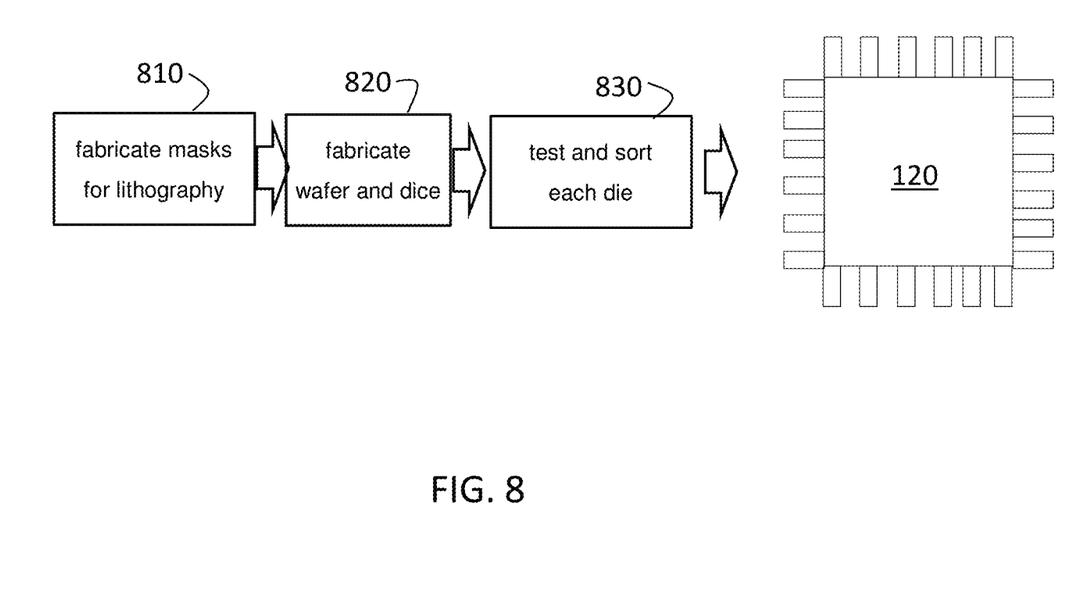
FIG. 8 is a process flow of a method of fabricating the integrated circuit according to exemplary embodiments of the invention.

FIG. 8 is a process flow of a method of fabricating the integrated circuit 120 according to exemplary embodiments of the invention. Once the physical design data is obtained, based, in part, on the pessimism reduction in cross-talk noise determination according to embodiments of the invention, the integrated circuit 120 can be fabricated according to known processes that are generally described with reference to FIG. 8. Generally, a wafer with multiple copies of the final design is fabricated and cut (i.e., diced) such that each die is one copy of the integrated circuit 120. At block 810, the processes include fabricating masks for lithography based on the finalized physical layout. At block 820, fabricating the wafer includes using the masks to perform photolithography and etching. Once the wafer is diced, testing and sorting each die is performed, at block 830, to filter out any faulty die.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A method of developing an integrated circuit, the method comprising:

selecting a desired yield for a circuit used in the integrated circuit, wherein the desired yield corresponds to a desired failure probability of the circuit;

determining, using a processor, a parameter threshold value that corresponds with the desired yield, wherein the parameter is a circuit simulation output used in testing and improvement of a design of the integrated circuit and the circuit passes if the parameter associated with the circuit is below the parameter threshold value and the desired yield indicates a percentage of instances of the circuit that pass according to the parameter threshold value;

using, by the processor, the parameter threshold value that corresponds with the desired yield during the testing and improvement of the design of the integrated circuit; and providing the design of the integrated circuit for fabrication.

2. The method according to claim 1, wherein the determining the parameter threshold value that corresponds with the desired yield includes generating samples of the parameter, each sample being generated by performing the circuit simulation of the circuit defined by a different set of values of features of the circuit, each set of values of the features being within a specified variation range for the features of the circuit.

3. The method according to claim 2, wherein the generating the samples of the parameter includes scaling the set of values of the features by different scale factors greater than one.

4. The method according to claim 3, wherein the determining the parameter threshold value that corresponds with the desired yield includes iteratively setting a threshold estimate on the samples of the parameter, determining a yield estimate corresponding with the threshold estimate, and determining whether the yield estimate corresponding with the threshold estimate is the desired yield.

5. The method according to claim 4, wherein the iteratively setting the threshold estimate is based on a binary search approach to converge on the parameter threshold value.

6. The method according to claim 4, wherein the determining the yield estimate includes implementing a curve fit on points derived from the samples associated with the different scale factors to determine the yield estimate.

7. The method according to claim 1, wherein the parameter threshold value is a delay value, and the using the parameter threshold value during testing includes using the delay value during a timing analysis of the circuit.

8. A system, comprising:

a memory device configured to store a design of the integrated circuit; and a processor configured to obtain a desired yield for a circuit used in the integrated circuit, wherein the desired yield corresponds to a desired failure probability of the circuit, to determine a parameter threshold value that corresponds with the desired yield, wherein the parameter is a circuit simulation output used in testing and improvement of a design of the integrated circuit and the circuit passes if the parameter associated with the circuit is below the parameter threshold value and the desired yield indicates a percentage of instances of the circuit that pass according to the parameter threshold value, to use the parameter threshold value that corresponds with the desired yield during testing and improvement of the design of the integrated circuit, and to provide the design of the integrated circuit for fabrication.

9. The system according to claim 8, wherein the processor is configured to determine the parameter threshold value that corresponds with the desired yield by generating samples of the parameter, each sample being generated by performing the circuit simulation of the circuit defined by a different set of values of features of the circuit, each set of values of the features being within a specified variation range for the features of the circuit.

10. The system according to claim 9, wherein the processor is further configured to generate the samples of the parameter by scaling the set of values of the features by different scale factors greater than one.

11. The system according to claim 10, wherein the processor is further configured to determine the parameter threshold value that corresponds with the desired yield by iteratively setting a threshold estimate on the samples of the parameter, determining a yield estimate corresponding with the threshold estimate, and determining whether the yield estimate corresponding with the threshold estimate is the desired yield.

12. The system according to claim 11, wherein the processor iteratively sets the threshold estimate based on a binary search approach to converge on the parameter threshold value.

13. The system according to claim 11, wherein the processor is further configured to implement a curve fit on points derived from the samples associated with the different scale factors to determine the yield estimate.

14. The system according to claim 8, wherein the parameter threshold value is a delay value, and the processor is further configured to use the delay value during a timing analysis of the circuit.

15. A computer program product for developing an integrated circuit, the computer program product comprising a computer readable storage medium having program instructions embodied therewith, the program instructions executable by a processor to perform a method comprising:

selecting a desired yield for a circuit used in the integrated circuit, wherein the desired yield corresponds to a desired failure probability of the circuit;

determining a parameter threshold value that corresponds with the desired yield, wherein the parameter is a circuit simulation output used in testing and improvement of a design of the integrated circuit and the circuit passes if the parameter associated with the circuit is below the parameter threshold value and the desired yield indicates a percentage of instances of the circuit that pass according to the parameter threshold value; and using the parameter threshold value that corresponds with the desired yield during testing and improvement of the design of the integrated circuit, wherein the design of the integrated circuit is provided for fabrication.

16. The computer program product according to claim 15, wherein the determining the parameter threshold value that corresponds with the desired yield includes generating samples of the parameter, each sample being generated by performing the circuit simulation of the circuit defined by a different set of values of features of the circuit, each set of values of the features being within a specified variation range for the features of the circuit.

17. The computer program product according to claim 16, wherein the generating the samples of the parameter includes scaling the set of values of the features by different scale factors greater than one.

18. The computer program product according to claim 17, wherein the determining the parameter threshold value that corresponds with the desired yield includes iteratively setting a threshold estimate on the samples of the parameter, determining a yield estimate corresponding with the threshold estimate, and determining whether the yield estimate corresponding with the threshold estimate is the desired yield.

19. The computer program product according to claim 18, wherein the iteratively setting the threshold estimate is based on a binary search approach to converge on the parameter threshold value, and the determining the yield estimate includes implementing a curve fit on points derived from the samples associated with the different scale factors to determine the yield estimate.

20. The computer program product according to claim 15, wherein the parameter threshold value is a delay value, and the using the parameter threshold value during testing includes using the delay value during a timing analysis of the circuit.

* * * * *